Patented Jan. 26, 1954

2,667,441

UNITED STATES PATENT OFFICE 2,667,441

METHOD FOR THE RECOVERY OF NEOMYCIN

Urs F. Nager, Terre Haute, Ind., assignor to Commercial Solvents Corporation, Terre Haute, Ind., a corporation of Maryland No Drawing. Application August 2, 1950,
Serial No. 177,337

4 Claims. (Cl. 167—65)

My invention relates to a method for the recovery of neomycin from impure aqueous solutions thereof and more particularly it relates to an ion-exchange process for the recovery of neomycin from culture media in which it is produced.

Neomycin, a recent addition to the list of antibiotic substances, was first reported by Waksman and Le Chevalier in March 1949 (Science, vol. 109, page 305). It is active against many Gram-positive and Gram-negative bacteria. Neomycin has an antibiotic spectrum somewhat similar to streptomycin but is active against many streptomycin-resistant strains of bacteria including M. tuberculosis.

Neomycin is produced by a soil organism of the Streptomyces species similar to Streptomyces fradiae when grown in nutrient media. The neomycin thus produced is a thermostable, basic compound which is soluble in water. Because of its alkaline nature, neomycin is usually used in the form of its neutral salts, such as, for example, neomycin sulfate.

In the past, the recovery of neomycin from the culture media in which it is produced has been accomplished by various methods including char adsorption, extraction, etc. These prior processes, however, have not been particularly satisfactory since the product produced is of relatively low purity and the material cannot be produced in quantities large enough for commercial scale operations. Therefore it has become increasingly evident that a better process was required for the practical and economical recovery of this important new antibiotic.

I have now discovered a method for recovering neomycin from aqueous solutions thereof, including nutrient media in which neomycin is produced, which consists primarily in adsorbing neomycin on a carboxylic acid, cation-type, ion-exchange resin by passing the neomycin solution through a bed of such a resin, eluting the neomycin from the resin with a solution of a base strong enough to displace the neomycin on the resin and then either recovering the neomycin from the eluate or purifying it further. By my new process, I can recover neomycin of high purity and in large quantities which makes it a process suitable for commercial scale operations. In addition, my new process is practical and economical since it does not require large volumes of solvent such as are required in the extraction processes heretofore developed.

As I have previously mentioned above, the first step of my invention consists of passing an aqueous solution of neomycin, including neomycin culture media from which the solids have been removed, through a bed consisting of a carboxylic acid, cation-type, ion-exchange resin. The neomycin, being a basic substance, is adsorbed by the resin which contains free carboxy groups. I have found that the pH of the carboxylic acid, cation-type, ion-exchange resin is usually between about 4.0 and 4.5 and my process is operative when the pH of the resin is at this level. In operating my process when the pH of the resin is between about 4 and 4.5, I have found that there is some leakage of neomycin through the resin bed. In other words, as the solution of neomycin passes through the bed, most of the neomycin is adsorbed, except that about 19 to 20 units of neomycin per ml. passes on through the bed in the run-off without being adsorbed. However, with continued passage of the neomycin solution through the resin, the pH of the resin rises and the leakage disappears until the capacity of the bed is exhausted. The capacity of the resin is about 10,000 to 12,000 units of neomycin per ml. of resin and when approximately this quantity of neomycin has been adsorbed there is a sharp break-through at which point the neomycin solution passes through the bed of resin without any additional neomycin being adsorbed. At this point the neomycin which has been adsorbed must be eluted from the resin before further adsorption can be accomplished.

I have found in the operation of my process that when the carboxylic acid, cation-type, ion-exchange resin is buffered to a pH between about 6 and 8, the potency of the neomycin isolated is higher than when the unbuffered resin of a pH between about 4 and 4.5 is used. For example, I have found that when the unbuffered resin is used, I can subsequently isolate neomycin of a potency of about 140 units per milligram but when the resin is buffered to a pH of between about 6 and 8, I can isolate neomycin of a potency of about 200–240 units per milligram. In buffering the resin which I employ in my process, I can use any usual buffer compound such as for example alkali and alkaline earth metal acetates, formates, chlorides, hydroxides etc. However, I prefer to use a 1 to 2 normal solution of alkaline sodium acetate to buffer the resin until the pH of the run off from the resin column is between about 6 and 8.

When the neomycin has been adsorbed on the resin to such an extent that the capacity of the resin has been almost exhausted or until a break through has occurred, the continued passage of neomycin solution through the resin must be discontinued and the neomycin already adsorbed must be eluted. In eluting the neomycin from the resin, I can use any of the so-called organic nitrogen bases such as for example primary, secondary, and tertiary aliphatic amines, cyclic aliphatic amines and aromatic amines. In addition to these classes of compounds which I can use to elute the neomycin from the resin in my process, I can use and I prefer to use an ammonia water solution and throughout this specification and the claims attached hereto I intend for the term amine and, more specifically, the term aliphatic amine to include therein ammonia water solutions. Other specific examples of compounds which I can use to elute the neomycin from the resin on which it is adsorbed are the various methylamines, ethylamines, propylamines, butylamines, etc.; cyclohexylamine, cyclobutylamine; aniline, pyridine, pyridine bases such as the picolines, etc. Among these compounds ethylamine has the highest dissociation constant, namely $5.6 \times 10^{-4}$, while aniline has the lowest, namely $3.83 \times 10^{-10}$. Ammonium hydroxide has an intermediate constant of $1.8 \times 10^{-5}$. It follows that nitrogen bases having dissociation constants within the range of from about $5.6 \times 10^{-4}$ to $3.83 \times 10^{-10}$ can be used as eluting agents in my process. In the operation of my process, I have found that the concentration of the neomycin in the eluate is, within certain limits, proportional to the concentration of the eluting solution used. Thus with concentrations of ammonia water between about 2 and 8% the concentration of the neomycin in the eluate increases with the concentration of ammonia being used. However, when using concentrations near the upper limits of this range there is considerable evolution of heat as well as the appearance of the alkali or alkaline earth metal portion of the buffer compound in the eluate. Nevertheless I have found that concentrations of ammonia water ranging from about 1.5% to about 10% are operative as eluting agents. I prefer to use ammonia water of a concentration of approximately 3.5% since I can obtain a 20 fold enrichment of the neomycin from the original aqueous solution to the eluate with this concentration as well as achieving the elution without appreciable heat evolution and without the appearance of the alkali or alkaline earth metal portions of the buffer compound in the eluate.

The eluate containing the neomycin which I obtain from the resin column can be concentrated and then dried or dried without being concentrated. However, in any case the excess ammonia should be driven off before the dry neomycin is isolated. I prefer to concentrate the eluate to a volume between about 12 and 25% of its original volume since this facilitates the drying operation. However, it is not satisfactory to concentrate the eluate to a volume less than about 12% of its original volume since the solution when concentrated to this extent becomes too viscous.

As has previously been mentioned, the neomycin adsorbed on the carboxylic acid, cation type, ion-exchange resin can be eluted from the resin and recovered as the dry neomycin base; however, the neomycin recovered in this manner is usually colored to some extent and generally contains pyrogenic materials which make it unsatisfactory for therapeutic administration. This being the case I prefer to further purify the neomycin contained in the eluate obtained from the carboxylic acid, cation type, ion-exchange resin. I accomplish this further purification by passing the partially purified neomycin solution through a strong basic, anion-type, ion-exchange resin. This resin adsorbs the color and pyrogens, the neomycin passing to the run-off as a solution of purified material. The neomycin solution obtained in this manner is a solution of neomycin base and because of the alkaline nature of the neomycin, I prefer to neutralize the aqueous solution with a strong mineral acid, such as sulfuric acid, hydrochloric acid, etc. By drying the thus neutralized neomycin solution, I am able to obtain a dry neutral salt of neomycin such as neomycin sulfate, neomycin chloride, etc.

I have found that in the operation of my process, I am able to use the carboxylic acid, cation type, ion-exchange resin through about three cycles of adsorption and elution after which the resin must be regenerated before further adsorption of neomycin is attempted. The necessity of regeneration is caused by the fact that impurities in the various solutions which pass through the resin are adsorbed thereon and then not eluted by the organic base which I use for the elution of the neomycin. Between each of the two or three cycles of adsorption and elution before regeneration becomes necessary, I merely wash out the excess of the organic base used in the elution step and then proceed with the adsorption step. In regenerating the resin, I pass about a one normal solution of hydrochloric acid through the resin bed until the acid passes through the bed unneutralized, which condition serves as an indication of the complete regeneration of the resin. In the case of the strong basic, anion-type, ion-exchange resin, the same considerations with regard to regeneration are applicable. However, this resin is regenerated by passing about a 1 to 2 normal solution of sodium hydroxide through the bed until the sodium hydroxide comes through the bed unneutralized.

The following examples are offered to illustrate my invention and it is not intended that my invention be limited to the specific materials and proportions shown therein.

EXAMPLE I

A 250 ml. portion of a filtered neomycin culture medium containing 105,000 units of neomycin was run through a column containing 25 ml. of an unbuffered carboxylic acid, cation type, ion-exchange resin having a pH of 4.4. The column was 130 mm. long and 15 mm. in diameter. The resin was that sold under the trade name of "Amberlite IRC-50" by the Rohm and Haas Company. The neomycin was then eluted with 140 ml. of a 3% solution of ammonia water and the eluate taken off in 20 ml. fractions. The following table shows the results.

*Table I*

| Fraction | Activity in units/ml. | Total Activity, units |
|---|---|---|
| Spent Culture Medium | 0 | 0 |
| 1 and 2 | 0 | 0 |
| 3 | 300 | 6,000 |
| 4 | 2,620 | 54,400 |
| 5 | 1,300 | 26,000 |
| 6 | 250 | 5,000 |
| 7 | 5 | 100 |
| | | 91,500 |

In the above example a total recovery to the eluate of 87% was realized. The fourth fraction shown in Table I was freeze dried under vacuum giving 412 mg. of solids containing 147 units of neomycin per mg. (microbiological assay).

EXAMPLE II

A 250 ml. portion of a filtered neomycin culture medium containing 105,000 units of neomycin was run through a 25 ml. bed of a carboxylic acid, cation type, ion-exchange resin buffered to pH 7 with a 1 normal solution of sodium acetate. The column was 130 mm. long and 15 mm. in diameter and the resin was that sold under the trade name of "Amberlite IRC-50" by the Rohm and Haas Company. The neomycin was eluted with 100 ml. of a 2.8% solution of ammonia water and the eluate taken off in 20 ml. fractions. The following table shows the results.

*Table II*

| Fraction | Activity in units/ml. | Total Activity, units |
|---|---|---|
| Spent Culture Medium | 0 | 0 |
| 1 | 15 | 300 |
| 2 | 4,500 | 90,000 |
| 3 | 640 | 12,800 |
| 4 | 131 | 2,600 |
| 5 | 48 | 1,000 |
| | | 106,700 |

In this example a recovery to the eluate of 100% was obtained. The second fraction was freeze dried under vacuum giving 494 mg. of solids containing 201 units of neomycin per mg. (microbiological assay).

EXAMPLE III 115 gallon portion of filtered neomycin culture medium containing 450 units of neomycin per milliliter was run in 40 gallon increments through a column containing 5.5 liters of a carboxylic acid, cation-type ion-exchange resin buffered to pH 7 with a 2 normal solution of sodium acetate. The column was 5.5 ft. long and 4 inches in diameter. The resin was that sold under the trade name of "Amberlite IRC-50" by the Rohm and Haas Company. The neomycin was then eluted with 3% ammonia water and the eluate, amounting to 10.5 gallons, contained 3258 units of neomycin per milliliter. The eluate was then concentrated to 4000 milliliters containing 24,000 units of neomycin per milliliter. The concentrate was run through a column containing 5.5 liters of a strong basic, anion-type, ion-exchange resin to remove color and pyrogens. The column was the same size as that used in the initial step and the resin was that sold under the trade name of Amberlite XE-75 by the Rohm and Haas Company. The run off containing the purified neomycin amounted to 3000 ml. containing 22,000 units of neomycin per milliliter. This solution was neutralized with sulfuric acid and the neutral solution freeze dried under vacuum to produce 360 grams of neutral neomycin sulfate containing 180 units of neomycin per milligram.

I do not intend for my invention to be construed as being limited to the specific materials, conditions, and amounts shown in this specification and the attached claims. It is to be understood that all equivalents thereto are expressly included herein.

Now having disclosed my invention, what I claim is:

1. A process for recovering neomycin from aqueous solutions thereof which comprises adsorbing the neomycin on a carboxylic acid, cation-type, ion-exchange resin having a pH within the range of from about 4 to 8, eluting the neomycin from the resin with an aqueous solution of a nitrogen base having a dissociation constant ranging from about $5.6 \times 10^{-4}$ to $3.83 \times 10^{-10}$ and selected from a class consisting of organic amines and ammonia, and recovering the neomycin from the eluate.

2. The process of claim 1 wherein the neomycin is eluted from the resin with a dilute solution of ammonia having a concentration ranging from about 1.5 to 10% by weight.

3. The process of claim 1 wherein the eluate is contacted with a strong basic, anion-type, ion-exchange resin to remove impurities prior to recovery of the neomycin.

4. A process for recovering neomycin from aqueous solutions thereof which comprises adsorbing the neomycin on a carboxylic acid, cation-type, ion-exchange resin buffered to produce a pH within the range of from about 6 to 8, eluting the neomycin from the resin with an aqueous solution of ammonia having a concentration of from about 1.5 to 10% by weight, concentrating the resulting eluate, contacting the concentrated eluate with a strong basic, anion-type ion-exchange resin to remove impurities, neutralizing the neomycin base in the run-off solution with a mineral acid and recovering the resulting neomycin salt.

URS F. NAGER.

References Cited in the file of this patent

UNITED STATES PATENTS

| Number | Name | Date |
|---|---|---|
| 2,505,053 | Kuehl | Apr. 25, 1950 |
| 2,528,022 | Wayne | Oct. 31, 1950 |
| 2,528,188 | Taylor | Oct. 31, 1950 |
| 2,553,685 | Spielman | May 22, 1951 |

OTHER REFERENCES

"Amberlite Ion Exchange Resins," Rohm & Haas, April 1949, 9 pages on IRC-50.

Waksman on Neomycin in Science, volume 109, March 25, 1949, pages 305 to 307.

Swart on Neomycin in Arch. of Biochem., volume 24, November 1949, pages 92 to 103.